(No Model.)
J. G. MOOMY.
PNEUMATIC TIRE.
No. 596,436. Patented Dec. 28, 1897.
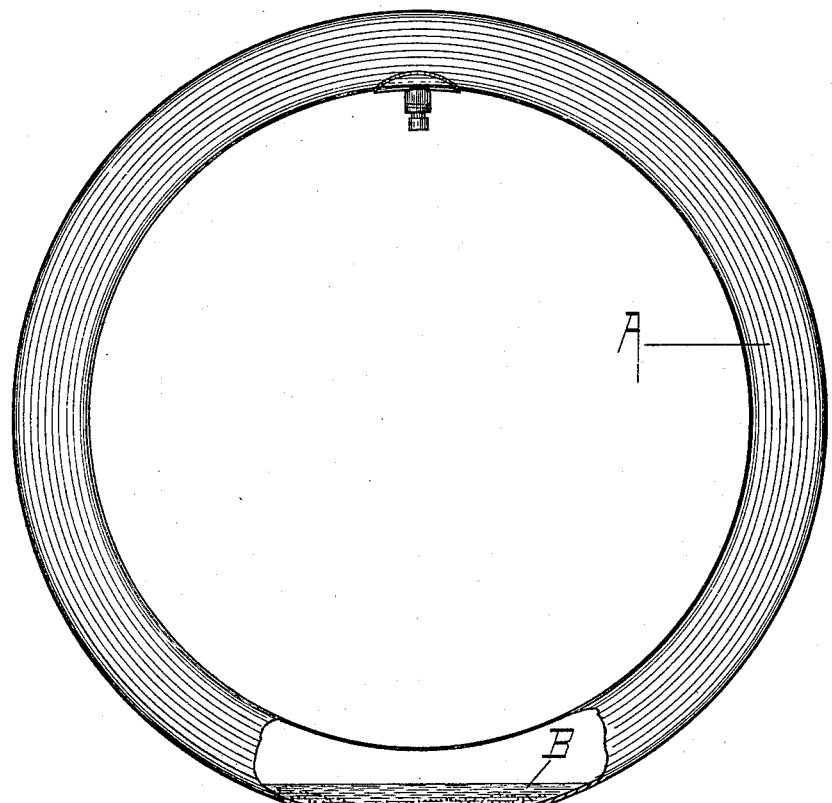
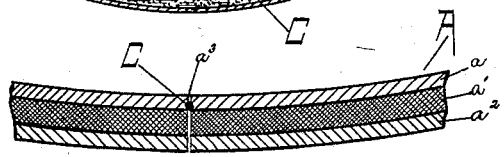
WITNESSES:
INVENTOR
Joseph J. Moomy
BY
Hallock & Lord
ATTORNEY.

United States Patent Office.

JOSEPH G. MOOMY, OF ERIE, PENNSYLVANIA.

PNEUMATIC TIRE.

SPECIFICATION forming part of Letters Patent No. 596,436, dated December 28, 1897.

Application filed December 1, 1896. Serial No. 614,042. (No model.)

*To all whom it may concern:*

Be it known that I, JOSEPH G. MOOMY, a citizen of the United States, residing at Erie, in the county of Erie and State of Pennsylvania, have invented certain new and useful Improvements in Pneumatic Tires; and I do hereby declare the following to be a full, clear, and exact description of the invention, such as will enable others skilled in the art to which it appertains to make and use the same.

This invention relates to pneumatic tires; and it consists in certain improvements therein, as will be hereinafter fully described, and pointed out in the claim.

The object of the invention is to provide a simple and effective means of closing punctures in pneumatic tires.

The invention is illustrated in the accompanying drawings as follows:

Figure 1 shows a side elevation of a tire, a part being broken away to show the repairing material within it. Fig. 2 shows a fragment of a tire enlarged with a puncture closed by my process.

The tire of my invention comprises the ordinary tire having within it a small quantity of sand-like material, preferably ordinary sand, and with it preferably a liquid, such as water. The method of repair consists in bringing this material over the puncture, with the tire under pressure.

In the drawings, A marks the tire, composed of the inner rubber wall $a$, fabric $a'$, and outer rubber wall $a^2$; B, the liquid, and C the sand-like material.

In Fig. 2 a puncture is represented at $a^3$, which a granule of the sand-like material has entered and closed. Presumably the correct theory of the operation of this material is that the air-pressure in the tire causes a current at the puncture which, when the material is brought over the puncture, carries a granule into the puncture and effects a closure. By using ordinary sand particles of innumerable sizes and shapes are obtained, some one of which will just fit the puncture, and this will effect the closure, those too small having passed through and those too large not having entered the puncture.

Sand is described in the *Standard Dictionary* as "any hard granular comminuted rock material finer than gravel and coarser than dust." This exactly describes the shape and size of the particles forming the material; but the material need not necessarily be of the nature of sand, though I prefer sand.

In using the term "sand-like material" I wish to be understood as referring to the comparative size and general shape of the material. The material to act in accordance with my invention must, however, have sufficient strength to prevent it being crushed and disintegrated by the action of the tire and must be insoluble in liquids to which it is exposed in use, and the particles should, preferably, be hard enough to maintain their shape.

The method is very cheap and for ordinary punctures is almost instantaneous, and in almost every case makes a complete and permanent closure. Furthermore the inner surface of the tire is not coated or injured, and where the tire becomes torn it can be remedied by the methods now employed.

What I claim as new is—

A pneumatic tire containing sand within the air-chamber said sand being free to move in said chamber.

In testimony whereof I affix my signature in presence of two witnesses.

JOSEPH G. MOOMY.

Witnesses:
   W. G. AUGUST,
   H. C. LORD.